United States Patent
Medal

[19]

[11] Patent Number: 5,971,860
[45] Date of Patent: Oct. 26, 1999

[54] DEVICE FOR DETECTING FAULTY RECESSES

[75] Inventor: James Medal, Cape Coral, Fla.

[73] Assignee: The Fastron Company, Franklin Park, Ill.

[21] Appl. No.: 09/116,171

[22] Filed: Jul. 16, 1998

[51] Int. Cl.$^6$ ...................................................... B21H 3/02
[52] U.S. Cl. .................................. 470/9; 470/12; 411/8; 72/31.01
[58] Field of Search ................ 470/8, 9, 11, 12, 470/47; 72/31.01; 411/8, 9, 13, 402

[56] References Cited

U.S. PATENT DOCUMENTS

| | | | |
|---|---|---|---|
| 2,996,943 | 8/1961 | Johnson | 470/9 |
| 3,316,744 | 5/1967 | Spangler | 72/31.01 |
| 4,033,003 | 7/1977 | Marroquin | 470/11 |
| 4,099,475 | 7/1978 | Lee, Jr. | 72/31.01 |
| 5,119,311 | 6/1992 | Gold et al. | 72/31.01 |

*Primary Examiner*—Joseph J. Hail, III
*Assistant Examiner*—Ed Tolan
*Attorney, Agent, or Firm*—Fitch, Even, Tabin & Flannery

[57] ABSTRACT

A fastener and method of manufacturing a threaded fastener with a tool-receiving recess in the fastener head are provided including a gauging indicator for indicating whether the recess is properly formed to meet standards. The gauging indicator is preferably in the form of a protrusion of a predetermined size on the fastener head which changes when the punch forming the recess becomes worn or broken. In this instance, the protrusion will be reduced in size as the material of the protrusion is displaced into the fastener head and other material of the fastener head is pushed into the areas of wear or breakage on the punch. Accordingly, the size of the gauging indicator provides an indication of whether the recess is meeting standards.

14 Claims, 3 Drawing Sheets

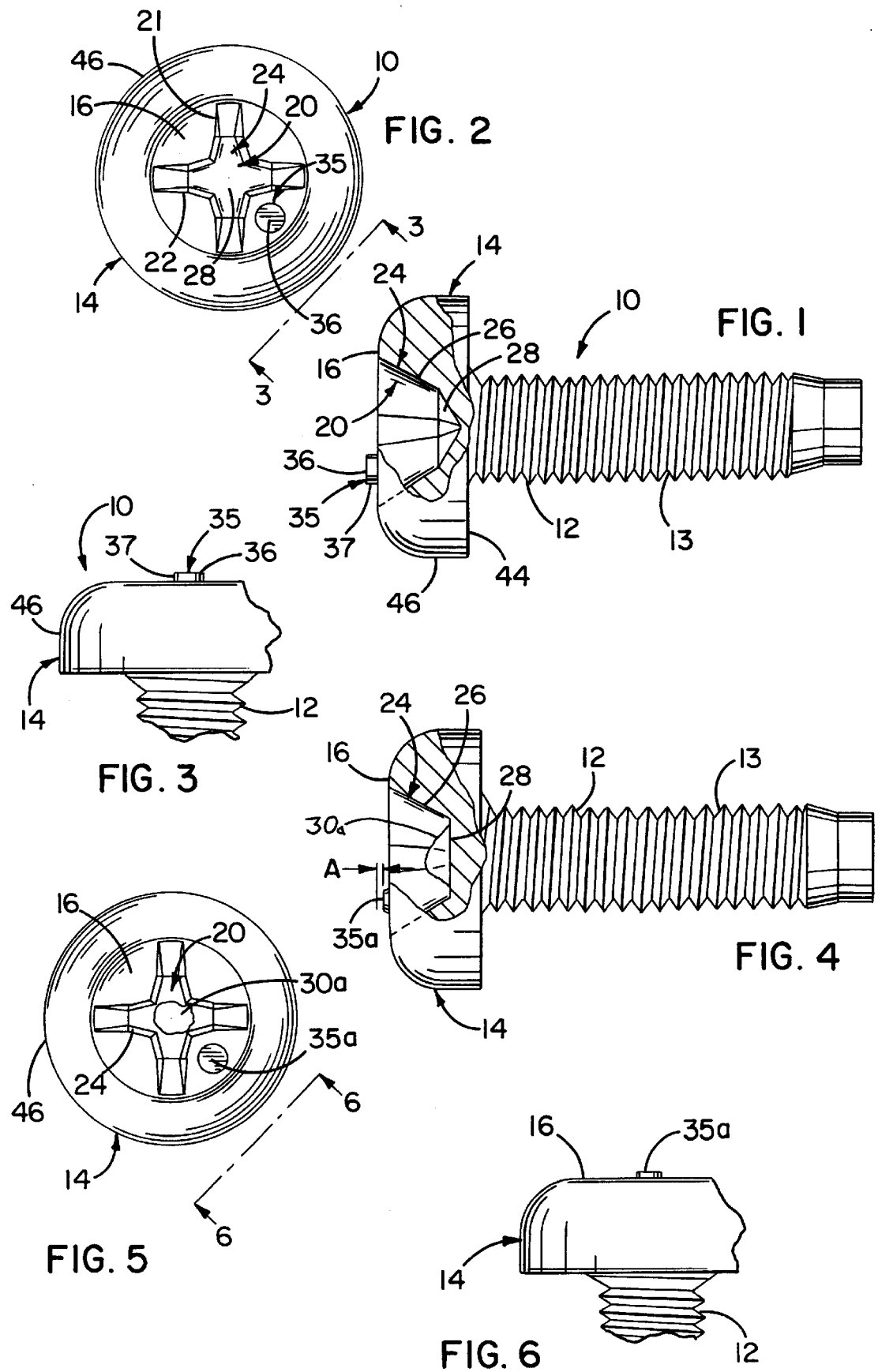

DEVICE FOR DETECTING FAULTY RECESSES

FIELD OF THE INVENTION

This invention relates to an apparatus and method for detecting worn punches, which are used to form recesses in a fastener and to detecting deviations in the recess formed by the punch from a standard size or shape for the recess.

BACKGROUND OF THE INVENTION

When forming with fasteners having a head and threaded shank with a tool-receiving recess in the head of the shank for receiving a screw driver or other driving tool, it is important that the recess-defining walls meets standards so that the driving tool properly fits into the recess and provides a maximum driving or turning torque for turning the threaded fastener. Typically, deviations with respect to the standard configuration of the driving recess are caused by wear or breakage of a portion of the punch. This allows metal to bulge at an area in one of the recess walls where the punch is worn or broken off. That is, during the formation of the recess, a tool is pushed into the metal; and the metal conforms to the shape of the punch including the worn away or broken away cavity areas, forming a bulge of extra metal at the worn away or broken cavity areas which prevents the mating of the driving tool directly and exactly in the fastener recess.

A problem with the detection of such minor bulges occurring almost anywhere within the recess is that the current manner of checking the fastener recess is to merely check the depth. Unless the bulges at the bottom wall of the recess interfere with the full insertion of the depth checking instrument, the bulge will not be detected using current standard measuring devices. Also, sometimes the punch tip may break so that a bulge may appear on the bottom of the wall of the recess; while the maximum depth be engaged is still apparently the full depth and most, or a substantial portion of the recess. Thus, there is a need to detect the punch wear or breakage of the punch during the manufacturing process, and also to detect, by examining the fastener, when the fastener is no longer meeting the standards for its driving recess. There is a need to eliminate and to detect any sloppy fit between the driving tool and the recess-defining walls and to also determine the condition of the punch used in the manufacturing process.

SUMMARY OF THE INVENTION

In accordance with the present invention, there is provided a new and improved method for manufacturing a fastener with a tool-receiving recess in the head of a fastener, and for indicating whether or not the tool-receiving recess is meeting acceptable standards. This is achieved by providing a gauging indicator on the head of the fastener which is formed of the fastener material and has a predetermined size or configuration which changes when the punch becomes worn or broken; and as a result, the tool-receiving recess is not meeting the standard. When the tool is worn or broken, the gauging indicator will be substantially reduced in size or shape because the material of the protrusion will be displaced into the fastener head while other fastener-forming material is being pushed into the cavity area on the punch where the punch is worn or broken. Thus, the size or shape of the gauging indicator indicates whether or not the tool-receiving recess is meeting or deviating from its standard configuration.

In accordance with the present invention, there is provided a new and improved method and apparatus for the detection of whether or not a punch is still good, is worn, or is broken. This is achieved by forming a gauging indicator on the head of the fastener, which is decreased or reduced in size corresponding to the amount of metal which is being used to fill in the cavity area on the punch which is broken or worn away. The greater the wear or the greater the size of the broken out area on the punch, the smaller will be the remaining gauging indicator on the fastener which will be visible on the head of the screw after the formation of the tool-receiving recess. It is preferred that a completely worn punch will displace substantially all of the gauging material thereby eliminating the gauging indicator from view when inspecting the fastener.

In accordance with another aspect of the invention, the preferred indicator is in the form of a small protrusion, which is formed on the head of the fastener where the impact force or the punch is mostly concentrated or directed so that the force to reduce the size of the protrusion is applied appropriately. The protrusion can be of any shape or size and it could be a letter indicating the name or some other indication with respect to the fastener or to the manufacturer of the fastener.

The preferred protrusion shape is that of a round protrusion projecting upwardly and outwardly from a top planar surface on the top head wall of the fastener. Simply by looking on the size or shape of the protrusion, one can detect whether or not the protrusion is still of the desired shape and size, indicating that the tool-receiving recess is meeting standards, or that the protrusion is so reduced in size that bulges must be present in the recess-defining walls. Such minor bulges can interfere with the proper mating fit of the driving tool and the full insertion of the driving tool into the recess. Thus, it will be seen that the present invention provides a method and apparatus for detecting a proper fit of the driving tool into a fastener recess and to determining the condition of the punch being used in the manufacturing process of the fastener.

BRIEF DESCRIPTION OF THE DRAWINGS

FIG. 1 is an elevational view of a fastener having a gauging material in the form of a protrusion thereon for indicating the quality of the tool-receiving recess and the condition of the punch used in making the tool-receiving recess;

FIG. 2 is a plan view of the fastener of FIG. 1;

FIG. 3 is a side, elevational view of the fastener of FIG. 1 having a head with a full size protrusion indicating a properly formed tool-receiving recess;

FIG. 4 is a side, elevational view of a tool-receiving recess having a bulge in a bottom wall of the recess;

FIG. 5 is a plan view of the fastener of FIG. 4;

FIG. 6 is a side, fragmentary view showing a reduced size of the protrusion for the fastener of FIG. 4;

FIG. 8 is a plan view of the fastener of FIG. 7;

DETAILED DESCRIPTION OF THE PREFERRED EMBODIMENT

Figure 7:
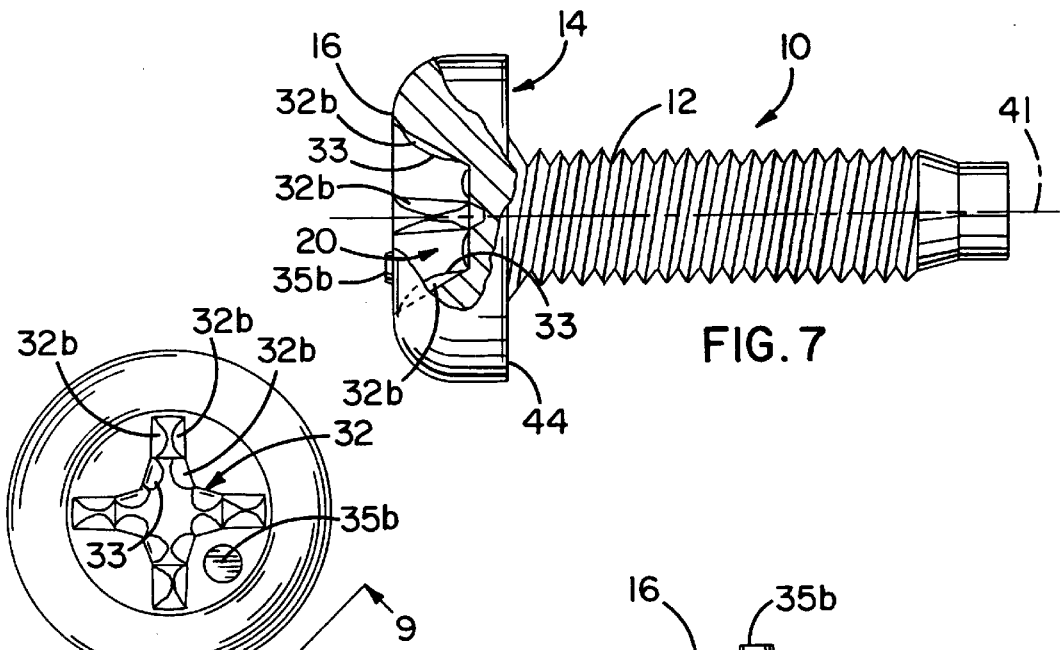
FIG. 7 is a side, elevational view of a fastener having bulging recesses in the inclined sidewalls as well as the bottom recess wall and having a reduced size gauging protrusion on the head of the fastener.

As shown in the drawings for purposes of illustration, the invention is embodied in a threaded fastener 10 having a threaded shank 12 with a thread 13 and with an integrally attached enlarged head 14. On the top wall 16 of the head is a tool-receiving recess 20. The illustrated tool-receiving recess is to receive a Phillips head screw driver and has the customary crossed leg recesses 21 and 22 (FIG. 2). The driving tool recess can be of any particular shape depending upon the type of fastener. Common shapes of recesses are shaped complimentary to and therein a square drive tool, a torque drive tool, and hex head driving tool, etc. The tool-receiving recess 20 is defined generally by recess-defining walls 24, which may included inclined downwardly and inwardly sloped walls 26 along the sides of the recess and a bottom wall or walls 28 located at the bottom at the recess against which the inserted tip of the driving tool is to engage.

It is intended that the driving tool fit and mate directly against each of the downwardly, inclined sidewalls 26 as well as with the bottom walls 28 so that the fit is tight and not sloppy. When all of the surfaces of the driving tool are mated and tightly fitted with the recess-defining walls, maximum torque may be applied to the fastener to turn it either to screw the fastener in or to unscrew the fastener from a member.

In the manufacturing process of the recess 20, a punch is brought into engagement with the top wall 16 of the head 14 of the fastener and forced against the fastener head to form the recess 20 in the head with the head material being pressed tightly against the walls of the punch. If, for example, a tip portion of the punch is broken or worn off leaving a cavity area that was not present when the punch was new, then the metal of the head will conform to the surface of the head and form a bulge 30a in the bottom wall 28, as shown in FIG. 4 at the location of the cavity on the punch and shape to the cavity on the punch.

As shown in the drawings for purposes of illustration, the invention is embodied in a method of checking whether or not the punch is still good, worn or broken, and whether or not the tool-receiving recess 20 is meeting standards. This is achieved by providing a gauging indicator or means, such as a gauging protrusion 35, on the fastener of a predetermined size or shape which changes to be substantially reduced in size or shape because the gauging protrusion is displaced when other fastener material is being pushed into the cavity area on the punch where it is worn or broken. For example, the gauging protrusion 35 is shown in FIGS. 1–3 having its full shape and size indicating that the punch is not worn or broken; and that the recess 20 is properly formed while the gauging protrusion 35a (shown in FIGS. 4–6) has been reduced by about one-half in height indicating that protrusion material has been displaced into the fastener to form a bottom bulge 30a (FIGS. 4 and 5) at the cavity area on the tool. In the example of FIGS. 4–6, the tip of the punch has been broken off leaving a cavity in the punch into which flowed the fastener material that formed the bottom bulge 30a in the bottom wall 28 of the recess. In FIGS. 4–6, the gauging protrusion 35a is reduced in height by the distance "A", which is about one-half of the height of the gauging protrusion 35 shown in FIGS. 1–3.

The gauging protrusion 35 may have various sizes and shapes and may be located at various positions on the fastener. Herein, it is preferred that the gauging indicator be in the form of the round protrusion 35 of circular shape with a top or end wall 36 and with a cylindrical sidewall 37 (FIG. 1). The gauging indicator 35 need not be circular or round and could be a letter or letters on the fastener indicating the name of the manufacturing or an identification of the particular fastener. The gauging indicator could be in a depression rather than an outward projection that changes in size or shape and indicates that fastener material is being displaced within the fastener to fill a punch cavity and form a bulge 30a or 32 (FIGS. 7 and 9) in the tool recess 20. Although the preferred gauging protrusion 35 changes in size, it could be made to change in shape or in shape and size.

It is preferred to locate the gauging protrusion 35 where the impact force of the punch is concentrated or directed so that force is directed effectively to change the size or shape of the protrusion 35 as other fastener material is forming the bulge 30a or 32 in one or more of the fastener recess walls 24. Herein, the protrusion 35 is formed on the top wall 16 of the head 14 where the punch pushes directly against the top wall 16 of the fastener. Herein, the gauging protrusion is positioned between a pair of the crossed legs of the Phillips head recess 20, as shown in FIG. 2.

In the example of FIGS. 4–6, the punch has a little broken area at its point; and thus, the bulge 30a is formed at the bottom wall 28 of the recess 20. The fastener is still a good fastener, in this instance, because the depth of the recess 20 and the inclined sidewalls 26 of the recess are still fine and free of bulges.

Figure 9:
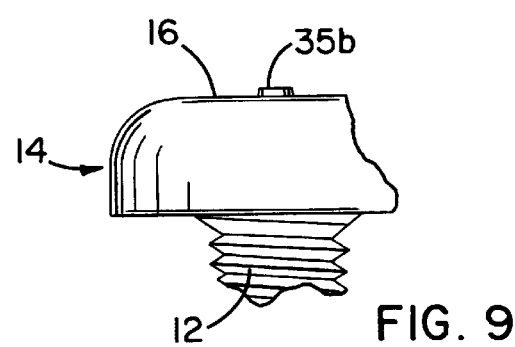
FIG. 9 is a fragmentary, side elevational view showing the reduced protrusion on the fastener of FIG. 7.

In the example of FIGS. 7–9, the punch is relatively worn; and the sidewall bulges 32, such as sidewall bulges 32b, are formed in the sloped sidewalls 26 of the recess 20, and bottom bulges 30a are present in the bottom wall 28 of the recess. Herein, the sidewall bulges 32b are shown with an outer curved wall 33 that project toward a longitudinal axis 41 of the fastener. The bulges 32b will be abutting a driving tool inserted into the recess. The bulges 32b also have sloped and curved sides 32b. A comparison of the recesses of FIGS. 2 and 8 show that the sloped recess walls 26 have been changed substantially in configuration because of the sidewall bulges 32b. Thus, a person inspecting the fasteners of FIGS. 1–3 and 7–9 will see that the gauging protrusion 35 in FIGS. 1–3 is very much higher and larger than the gauging protrusion 35b shown in FIGS. 7–9.

Figure 10:
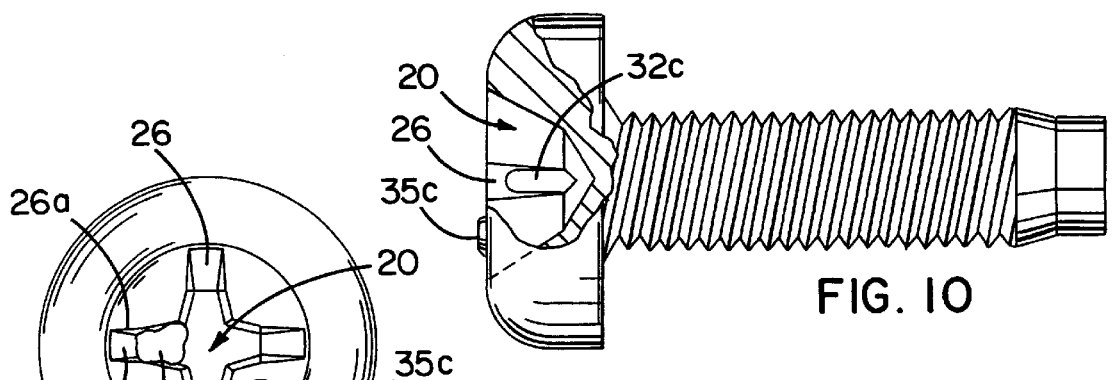
FIG. 10 is an elevational view of a fastener having a recessed head with a bulge in one recess inclined wall and having a reduced size of protrusion on the head of the fastener.
Figure 11:
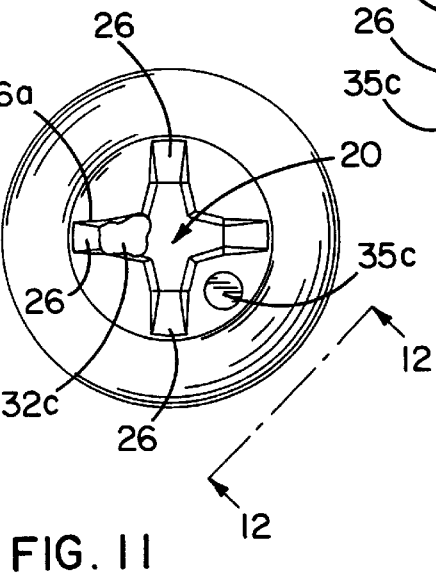
FIG. 11 is a plan view of the fastener of FIG. 10.
Figure 12:
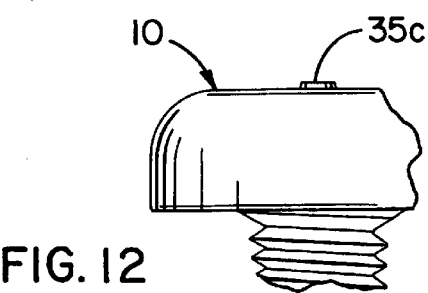
FIG. 12 is a fragmentary, side elevational view of the fastener of FIG. 10 showing a reduction in the size of the protrusion.

In some instances, there occurs a breaking of a portion of the punch that was not detected by conventional recess depth detecting tools. For instance, the punch forming the recess 20 (shown in FIGS. 10–12) has a broken portion that formed the lefthand recess wall 26a (FIG. 11) with a large bump or bulge 32c (FIGS. 10 and 11) that will prevent a driving tool from fully mating with the recess wall 26a and full depth insertion to the bottom of the recess 20. The protrusion 35c is shown in FIGS. 10 and 12 as being substantially reduced in size to the extent that it indicates that the punch should be replaced. In this instance, the protrusion 35c in FIGS. 10–12 is reduced by greater than 50% in height from its original size, thereby indicating, upon inspection of the fastener, that a substantial amount of the protrusion material is being displaced into the head 14 of the fastener. Thus, the protrusion 35c on the fastener in FIGS. 10–12 indicates both that the fastener is not meeting standards, and also that the punch should be replaced.

Figure 13:
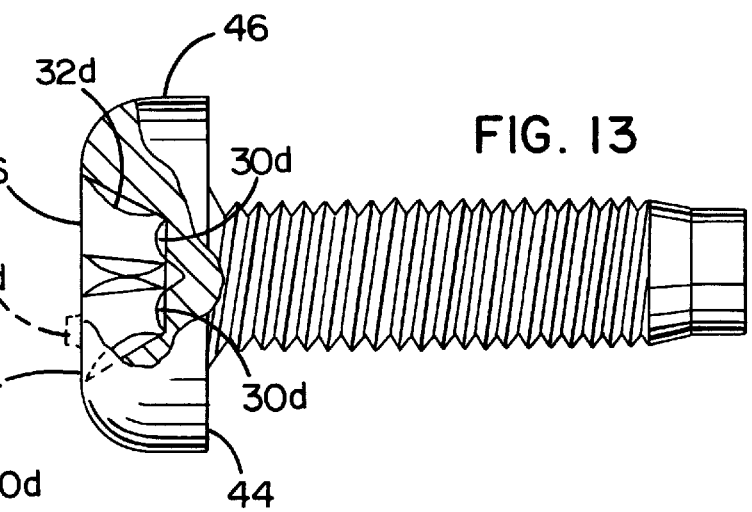
FIG. 13 is an elevational view of a fastener in which a gauging protrusion has been eliminated from the head of the fastener to indicate a broken or worn tool that should be replaced.
Figure 14:
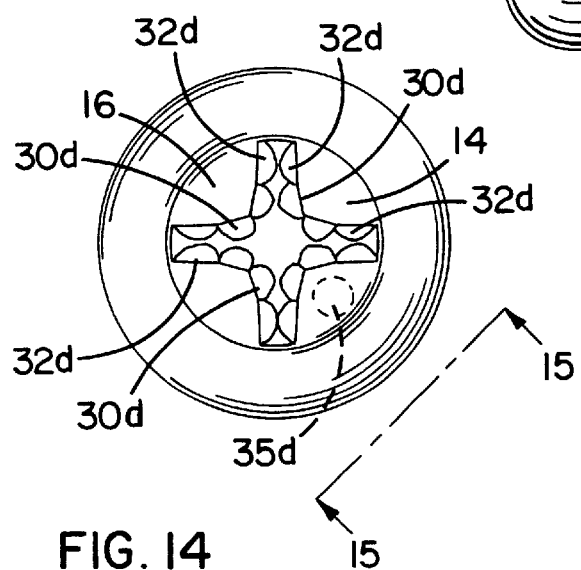
FIG. 14 is a plan view of the fastener of FIG. 13.
Figure 15:
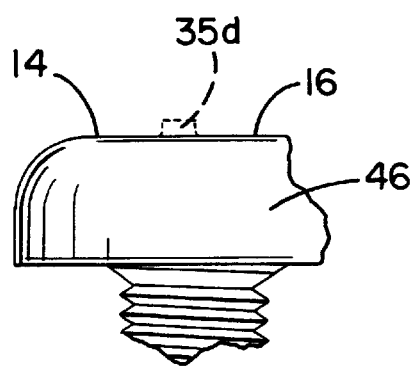
FIG. 15 is a fragmentary, side elevational view of the head of the fastener of FIG. 13 without any protrusion being shown.

In the case of a worn punch that should be replaced, all of the protrusion material may be forced into the fastener. Turning now to FIGS. 13–15, the fastener is shown with a head 14 where the fastener previously had a protrusion location 35d, shown in phantom lines, but the protrusion material of the protrusion 35 has all been forced into the fastener head 14 leaving a planar top surface 16 on the top of the fastener without any outward projection of fastener material at the protrusion location 35d on the top planar wall surface 16.

In the embodiment of FIGS. 13–15, sidewall bulges 32d are formed in each of the downwardly-inclined, recess walls 26, as well as bottom bulges 30d in the bottom wall 28 of the recess. These bulges 30d and 32d will prevent a satisfactory driving engagement between the driving tool and the fastener head.

It will be appreciated that the gauging indicator 35 need not be formed on the exterior top wall of the head, as in this illustrated embodiment of the invention. The gauging indicator 35 could be located on a bottom wall 44 of the head 14 or it could be formed on a side wall 46 of the head 14. It is best to have the gauging indicator 35 located where it will not interfere with the operation of the fastener and will not be obtrusive to the fastener purchaser.

The illustrated fastener is a metal screw fastener with an integral metal head 14 and metal shank 12 that is threaded and with the protrusion 35 formed thereon when making the fastener body and head. Typically, these threaded fasteners are formed of steel, aluminum, brass or other metals and produced from wire on metal header machines that operate at high production speed. It is not desirable to stop production to examine the punch forming the recess, as this interferes with production and such inspections heretofore have been a slow, tedious process. Because the screw making machine is operating at high production rates, a large number of defective fasteners may be produced over a relatively long time before there is a detection of the defect using conventional inspection processes. But with the gauging indicator on the fasteners, a quick inspection of the fastener and its indicator gives a quick and instant insight into the condition of the punch and the recess being formed by the punch.

Although the invention has been described with various preferred embodiments, it should be understood that various changes and modifications as would be obvious to one having the ordinary skill in this art may be made without departing from the scope of the invention which is defined in the appended claims.

What is claimed is:

1. A threaded fastener with an inspection indication related to the configuration of a driving recess, the fastener comprising:

a fastener body having an elongated shank;

a thread on the shank for threading into another member;

a driving head on the body having a top wall;

a plurality of surfaces projecting downwardly from the top wall of the driving head to define a tool-receiving recess having a standard predetermined configuration; and a gauging indicator on the fastener formed of a predetermined size with a predetermined amount of material when the punch forming the tool-receiving recess meets standards and forms the recess to the predetermined configuration, and having a substantially changed size with less than the predetermined amount of material when the gauging material is displaced to provide an indication that the tool-receiving recess is deviating from the standard predetermined configuration and an indication of the degree of this deviation by the difference between the predetermined size of the indicator and its changed size.

2. A threaded fastener in accordance with claim 1 wherein the gauging indicator is in the shape of a protrusion which is reduced in size from the predetermined size when a bulge is formed in one of the surfaces defining the recess with bulge size being related to the amount of material displaced from the protrusion.

3. A threaded fastener in accordance with claim 1 wherein the gauging indicator is located on the fastener body where the impact force of the punch is primarily directed.

4. A threaded fastener in accordance with claim 3 wherein the gauging indicator is located on the top wall of the fastener head.

5. A threaded fastener in accordance with claim 1 wherein the top wall of the fastener has a planar surface, and the gauging indicator is a protrusion which projects outwardly from the planar surface.

6. A fastener in accordance with claim 5 wherein the gauging protrusion is in the shape of a round button on the top wall of the fastener head.

7. A fastener in accordance with claim 1 wherein the recess-defining surfaces form a Phillips head-shaped recess with crossed legs; and the gauging indicator is a protrusion which is positioned between a pair of the crossed legs and on the top wall of the fastener head.

8. A fastener in accordance with claim 7 wherein the protrusion is decreased from its standard size and bowed material is on the inclined sidewalls of the recess.

9. A fastener in accordance with claim 5 wherein the protrusion is substantially eliminated from view to indicate a worn tool and a defective recess in the fastener head.

10. A method of manufacturing a threaded fastener having a gauging indicator thereon for detecting and measuring wear or a broken portion of a tool, the method comprising the steps of:

forming a fastener body having a shank on one end and a head on another end of the fastener body;

providing a gauging indicator on the fastener body having a predetermined size with a predetermined volume of metal material related to detecting wear or breakage of a portion of recess forming punch;

bringing the recess forming punch into contact with the fastener head and forcing the punch into the head to form recess defining walls shaped and sized to receive a fastener driving tool; and pushing against the gauging indicator with the recess forming punch to displace metal into any worn or broken areas on the punch to form bulges in the recess defining walls and to change the size of the gauging indicator to a size smaller than the predetermined size so that the indicator has less than the predetermined volume of material to indicate such worn or broken areas on the punch and the extent of the wear or breakage of the punch by the difference between the predetermined size of the indicator and its changed size.

11. A method in accordance with claim 10 wherein the step of pushing against the gauging indicator comprises the further step of directing the punch's impact force directly at the gauging indicator to displace metal therefrom.

12. A method in accordance with claim 11 including the step of forming a gauging protrusion on a top wall of the head of the fastener adjacent the recess.

13. A method in accordance with claim 12 including the step of forming a rounded, button-shaped protrusion projecting outwardly of the top wall of the fastener head.

14. A method in accordance with claim 12 including the step of forming a Phillips head recess with crossed legs and positioning gauging protrusion between the crossed legs.

* * * * *